(12) United States Patent
Kruglov

(10) Patent No.: US 11,599,443 B2
(45) Date of Patent: Mar. 7, 2023

(54) SYSTEM AND METHOD FOR ASSESSING AN IMPACT OF MALICIOUS SOFTWARE CAUSING A DENIAL OF SERVICE OF COMPONENTS OF INDUSTRIAL AUTOMATION AND CONTROL SYSTEMS

(71) Applicant: AO Kaspersky Lab, Moscow (RU)

(72) Inventor: Kirill N. Kruglov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 17/855,861

(22) Filed: Jul. 1, 2022

(65) Prior Publication Data
US 2022/0334949 A1 Oct. 20, 2022

Related U.S. Application Data

(63) Continuation of application No. 17/069,111, filed on Oct. 13, 2020, now Pat. No. 11,385,987.

(30) Foreign Application Priority Data

Feb. 26, 2020 (RU) .......................... RU2020108165

(51) Int. Cl.
*G06F 11/00* (2006.01)
*G06F 9/455* (2018.01)
(Continued)

(52) U.S. Cl.
CPC ........ *G06F 11/3604* (2013.01); *G05B 19/406* (2013.01); *G05B 2219/31229* (2013.01)

(58) Field of Classification Search
CPC .............. G06F 11/3604; G05B 19/406; G05B 2219/31229
See application file for complete search history.

(56) References Cited

U.S. PATENT DOCUMENTS 9,479,531 B1 10/2016 Watson
9,800,604 B2 * 10/2017 Knapp .................. G06F 21/577
(Continued)

OTHER PUBLICATIONS

Zheng et al., Cyber Security Risk Assessment for Industrial Automation Platform, 4 pages (Year: 2015).*
(Continued)

*Primary Examiner* — Thuy Dao
(74) *Attorney, Agent, or Firm* — ArentFox Schiff LLP; Michael Fainberg

(57) ABSTRACT

Disclosed herein are systems and methods for assessing an impact of malicious software causing a denial of service of components of industrial automation and control systems (IACS). In one aspect, an exemplary method comprises, generating a configuration of the IACS on a testing device based on specifications, obtaining a set of investigated software, where the set includes at least one sample of one malicious software, testing the generated configuration using the received set of investigated software, identifying occurrences of denials of service of the components of the testing device which are used to simulate the generated configuration, determining an impact of the malicious software on the generated configuration, and a degree of degradation of a performance of the generated configuration of IACS, and pronouncing a verdict as to a danger of the malicious software for the generated configuration of IACS based on the determined impact of the malicious software.

21 Claims, 7 Drawing Sheets

(51) Int. Cl.
  *H04L 29/06*   (2006.01)
  *G06F 9/445*   (2018.01)
  *G06F 11/36*   (2006.01)
  *G05B 19/406*  (2006.01)

(56) References Cited

U.S. PATENT DOCUMENTS

| | | |
|---|---|---|
| 9,933,772 B2 | 4/2018 | Lloyd et al. |
| 10,320,828 B1 | 11/2019 | Derbeko et al. |
| 2016/0308895 A1 | 10/2016 | Kotler et al. |

OTHER PUBLICATIONS

Ghaleb et al: "SCADA-SST: A SCADA security testbed", 2016 World Congress on Industrial Control Systems Security (WCICSS), Infonomics Society, Dec. 12, 2016, pp. 1-6.

* cited by examiner

SYSTEM AND METHOD FOR ASSESSING AN IMPACT OF MALICIOUS SOFTWARE CAUSING A DENIAL OF SERVICE OF COMPONENTS OF INDUSTRIAL AUTOMATION AND CONTROL SYSTEMS

CROSS REFERENCE TO RELATED APPLICATIONS

The present application is a continuation of U.S. patent application Ser. No. 17/069,111, filed on Oct. 13, 2020, which claims priority to Russian Patent Application No. 2020108165, filed on Feb. 26, 2020, the entire contents of which are incorporated herein by reference.

FIELD OF TECHNOLOGY

The present disclosure relates to the field of industrial automation and control systems, more specifically, to systems and method of assessing an impact of software, e.g., software being investigated, on industrial automation and control systems, such as automated control systems. For example, the impact of the software, e.g., a malicious software, may be investigated to identify and mitigate vulnerabilities that affect the availability of the industrial automation and control system, or to investigate malicious software causing a denial of service of components of industrial automation and control systems.

BACKGROUND

At present, one observes an interest on the part of various malicious actors in critical infrastructure objects. The critical infrastructure objects may comprise objects in industrial areas, such as objects used for electrical power supply, water supply, the oil and gas industry, the automotive industry, and for automation systems of buildings, data storage, and data transmission. These objects contain various systems of industrial automation, such as an Industrial Control System (ICS) or Industrial Automation and Control Systems (IACS). In turn, the ICS may contain monitoring systems. One example of an industrial monitoring system is an Automated Control System for Technological Processes (ACS TP).

The assurance of the safety of an ICS involves a specific process having a number of differences when compared with the traditional handling of cyber threats. A cyber threat is an assemblage of factors and conditions creating a danger of disruption of information security. In particular, the protection strategy of the ICS involves ways to preserve the operational capabilities of the technological process. In contrast, in corporate systems, it is more important to preserve the confidentiality and availability of data.

A large number of the threats to industrial systems and their respective ICS and IT systems involve ordinary malicious software, i.e., software that is not designed for targeted cyberattacks. In this context, "ordinary malicious software" refers to a malicious software that is not developed specially for an attack on industrial systems. Even so, as experience shows, while their impact on the working of IT systems is insignificant, these malicious software may affect the integrity and availability of components of the ICS, and as one consequence, they may indirectly affect the stability of the technological and manufacturing processes. For example, malicious programs, such as encryption malware and programs whose goal is to destroy files from the hard disk of a computer (wipers), may have devastating technical impact on ICS, and IT systems of various technological systems.

In another example, a miner program (a program for mining cryptocurrency by utilizing substantial computing resources) is considered relatively harmless in an office network. However, in the course of operation and propagation of miner programs, their mining activity may result in denial of service of certain components of the ICS.

In another example, network worms (a variety of malicious program) represent great danger to both IT systems and technological networks, and the consequences of their actions may be far more substantial when compared with the consequences of miner programs. For instance, with the help of network exploits, the network worms found on many computers of ICS are known to have propagated themselves through network folders, removable media, and through local (LAN) and global networks (WAN) and to have destroyed data on the infected devices. In a number of cases, such actions of network worms are able to cause a denial of service of the ICS, especially to the monitoring and remote control systems. Moreover, network worms may also result in emergency situations.

In another example, a multifunctional spyware is a software that is generally able to steal confidential information, download and run other malware, and cause further damage by providing the possibility of unauthorized remote control of the infected devices to other malicious actors. These programs are also known as backdoors.

The consequences of the activities on computers by such malicious software programs depend on the importance of the attacked technological systems to the production process and the business processes of the enterprise. In many cases, such malicious software programs have a disproportionately heavy impact on the ICS. This effect is due primarily to the specific architecture and intrusion in the systems of the ICS. As a result, malicious software that may not have a significant negative influence on the IT systems of an enterprise may yet result in severe consequences to the enterprise. For instance, the malicious software may cause downtime of systems in the industrial network and a disruption of the production processes.

It should also be pointed out that not only malicious software can have a substantial negative impact on ICS, especially on automated control systems, but also legitimate software which contains errors is able to result in unaccounted behavior and disruption of the working of the ICS.

Moreover, the security of industrial systems against external computer threats is itself an urgent problem. In particular, it is necessary to control and ensure the security of industrial controllers (Programmable Logic Controllers) and automated control systems.

At the same time, in order to create the necessary level of protection against threats, it is necessary to perform an advance assessment of the risks of industrial systems enabling a consideration of external actions on various elements (such as the PLC, SCADA, SiS) of industrial systems based on ordinary software and/or malicious software.

One example of a threat is attacks on elements of industrial systems during which those elements are notified of a denial of service. The usual strategy involves testing each individual device of the ICS in each configuration. This often causes problems, since the usual strategy requires purchasing and putting in place the devices of the ICS, which may prove to be a costly affair. Moreover, how a particular element will behave in an industrial network, which in most instances will be unique to the specific industrial object, is likewise unknown.

Thus, there is a need for a method for determination (i.e., in advance) of the conditions of occurrence of denials of service of industrial systems and their ICS elements (components) caused by indirect actions of the malicious software. In other words, there is a need for determining the impact of malicious software on industrial automation and control system prior to an attack.

SUMMARY

Aspects of the disclosure relate to assessing an impact of software on industrial automation and control systems, e.g., software being investigated for impact on industrial automation systems, or for assessing an impact of malicious software causing a denial of service of components of industrial automation and control systems.

In one exemplary aspect, a method is provided for assessing an impact of malicious software causing a denial of service of components of industrial automation and control systems, the method comprising: generating a configuration of an industrial automation and control system (IACS) on a testing device based on specifications, obtaining a set of investigated software, where the set includes at least one sample of one malicious software, testing the generated configuration of the IACS using the received set of investigated software, identifying occurrences of denials of service of the components of the testing device which are used to simulate the generated configuration of IACS, determining an impact of the malicious software on the generated configuration of the IACS, and a degree of degradation of a performance of the generated configuration of IACS, and pronouncing a verdict as to a danger of the malicious software for the generated configuration of IACS based on the determined impact of the malicious software.

In one aspect, the specifications include information on at least one of: the components of the IACS, functional capabilities of the components of the IACS, interactions that occur between the components of the IACS, and information on data exchanged between the components of the IACS.

In one aspect, the at least one sample is selected based on at least one of: a type of the industrial system, the components of the industrial system, components of the configuration of the IACS being tested.

In one aspect, the at least one sample is selected further based on an analysis of the malicious software in a simulated environment.

In one aspect, the selection of the at least one sample is performed using any number of criteria which indicate effects that represent a threat to at least one of: an availability, an operational capability, and an integrity of the configuration of the IACS.

In one aspect, the method further comprises: identifying indicators of compromise that influence failure in the operations of the generated configuration of IACS.

In one aspect, an assessment of the impact of malicious software is performed for any number of configurations that are generated, such that indicators of compromise are identified for each combination of a particular malicious software and a particular configuration generated of the IACS.

According to one aspect of the disclosure, a system is provided for assessing an impact of malicious software causing a denial of service of components of industrial automation and control systems, the system comprising a hardware processor configured to: generate a configuration of an industrial automation and control system (IACS) on a testing device based on specifications, obtain a set of investigated software, where the set includes at least one sample of one malicious software, test the generated configuration of the IACS using the received set of investigated software, identify occurrences of denials of service of the components of the testing device which are used to simulate the generated configuration of IACS, determine an impact of the malicious software on the generated configuration of the IACS, and a degree of degradation of a performance of the generated configuration of IACS, and pronounce a verdict as to a danger of the malicious software for the generated configuration of IACS based on the determined impact of the malicious software.

In one exemplary aspect, a non-transitory computer-readable medium is provided storing a set of instructions thereon for assessing an impact of malicious software causing a denial of service of components of industrial automation and control systems, wherein the set of instructions comprises instructions for: generating a configuration of an industrial automation and control system (IACS) on a testing device based on specifications, obtaining a set of investigated software, where the set includes at least one sample of one malicious software, testing the generated configuration of the IACS using the received set of investigated software, identifying occurrences of denials of service of the components of the testing device which are used to simulate the generated configuration of IACS, determining an impact of the malicious software on the generated configuration of the IACS, and a degree of degradation of a performance of the generated configuration of IACS, and pronouncing a verdict as to a danger of the malicious software for the generated configuration of IACS based on the determined impact of the malicious software.

The method and system of the present disclosure are designed to assess the impact of software, e.g., a malicious software being investigated, on industrial automation systems. The method and system may then be used for assessing an impact of malicious software causing a denial of service of components of industrial automation and control systems. For example, the impact on availability is assessed. The method of the present disclosure addresses the shortcomings described above and reveals the vulnerability points of various industrial automation and control systems, e.g., industrial control systems (ICS) based on an assessment of the influence of various software, such as malicious software, on the operational capability or availability of industrial control systems.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
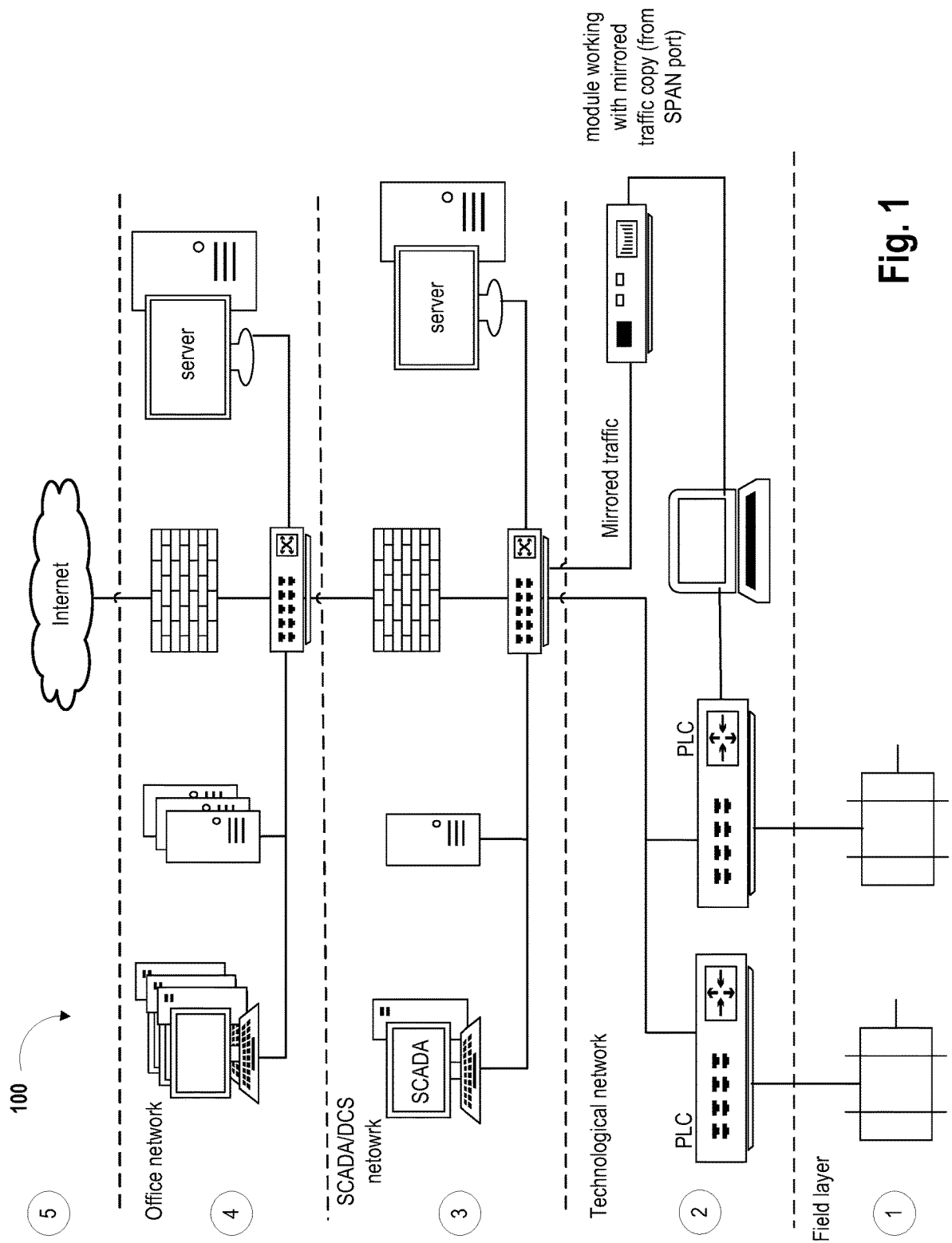
FIG. 1 presents an example of the architecture of an industrial infrastructure, for which the method of the present disclosure is realized.

Exemplary aspects are described herein in the context of a system, method, and a computer program for assessing an impact of malicious software causing a denial of service of components of industrial automation and control systems. For instance, software may be being investigated for impact on the industrial automation systems, such as by causing a denial of service. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for assessing an impact of software on industrial automation and control systems, e.g., software being investigated for impact on the industrial automation systems that is implemented on a computing system, that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 7). Furthermore, the system components may be realized either within a single computing device or spread out among several interconnected computing devices.

The present disclosure enables carrying out at least an assessment of the impact of malicious software on operations of a particular configuration of an industrial automation and control system (IACS). In one aspect, in the course of performing the at least one assessment, the system and the method of the present disclosure enable at least one of the following actions:

making an analysis of a malicious software in a simulated environment of a sandbox type, followed by an identification of a suitable malicious software for testing a particular configuration of the IACS, especially an ICS, performing of a controlled testing of samples of the malicious software in the simulated environment of a particular configuration of the IACS, especially an ICS, identification and measurement of the impact of each sample of the malicious software for a particular configuration of the IACS, especially an ICS, making an analysis of all identified causes (events) resulting in disruption of the operations of a particular configuration of the IACS, and pronouncing verdicts as to the danger of a particular sample of the malicious software in a particular configuration of the IACS.

In other aspects of the present disclosure, the method includes generating a corresponding report containing signs of compromise obtained as a result of the malicious activity of at least one sample of the malicious software, wherein the signs of comprise point to at least causes or events influencing one or another disruption of the operations of the IACS. Furthermore, the method of the present disclosure also enables an assessment of the influence of legitimate software on the operations of a particular configuration of the IACS.

The method of the present disclosure has several advantages. A first advantage is to broaden the arsenal of technical means for assessing the impact of software, e.g., the impact of malicious software that is being investigated, on the working capability of a particular configuration of an industrial automation system. A second advantage of the present disclosure is to identify the weak points of various industrial automation systems. A third advantage of the present disclosure is to identify, classify, and give notice of malicious software having major impact on a particular configuration of a particular system of IACS, especially an ICS.

The method and system of the present disclosure enable at least making an assessment of the impact of software (software being analyzed/investigated) on the operations (working capability) of a particular infrastructure configuration of an industrial automation and control system (IACS). An IACS primarily refers to various industrial control systems (ICS), brought together in an industrial information and communication network. In turn, an example of an ICS is an automated control system for technological processes (ACS TP) and its components. The ICS is a group of hardware and software solutions designed to automate the control of technological equipment at industrial enterprises. Examples of the components of an ICS are: Supervisory Control And Data Acquisition (SCADA) systems, Distributed Control Systems (DCS), Safety instrumented Systems (SiS), systems based on Programmable Logic Controllers (PLC), data gateways, Open Platform Communication (OPC), and network equipment bringing together the mentioned systems into a technological network, and so forth.

In the context of the present disclosure, "investigated software" refers primarily to malicious software, but not only malicious software. Thus, the investigated software may also be software which is able to harm the operations of the IACS. Examples of such investigated software are:

legitimate software which is incompatible or only partially compatible with the IACS or its components, legitimate software containing errors able to result in unaccounted behavior of the IACS or its components, specialized (certified) software which has been modernized, or a new version has been released, noncertified software, which is generally legitimate and is designed directly for the operations of a component of the IACS, and untrusted software whose actions may cause a denial of service of a component of the IACS or result in emergency situations.

Thus, the method of the present disclosure allows detection of any anomalies in the operations of the investigated software, and enables an assessment of the impact of the investigated software as to its compatibility or incompatibility with the targeted software in industrial systems and networks. It should also be noted that the malicious software includes non-targeted malicious software. Non-targeted malicious software is malicious software that is not originally created to cause any harm directly to industrial systems and networks. Most likely, the impact and the harm caused by non-targeted malicious software is a side effect or even a result of an error in the development of such software.

The method of the present disclosure has the following functional capabilities for assessing the impact of investigated software on the operational capabilities of, for example, an ICS and similar systems:

1) Automated analysis of the functionality and behavior of computer programs detected both on personal computers of users and in the network, followed by identifying of the types and the actual samples of the investigated software which are potentially able to cause harm to the systems of the ICS.

2) Performance of at least one automated investigation on a testing device, simulating a particular configuration of the ICS or several different ICS for at least one investigated software in the course of the screening presented in item 1. During the investigation, the effect of the software is evaluated as it functions in the presented configuration of the ICS on the testing device, according to various parameters, including parameters for measuring the productivity and/or temporary failures in the operations of the ICS and its components or the objects controlled by the ICS.

3) Classification of the investigated software (especially malicious software) according to the software's impact on the ICS and determination of indications of compromise and the artifacts produced as a result of the analysis of the impact of the investigated software on the ICS, creating of signatures or rules of behavior for making possible detection of indications that may be used subsequently to for finding infections of the ICS by the corresponding software.

4) Making a decision on performing additional investigations or possible measures for protecting against the investigated (malicious) software, both immediately in the system of the ICS and in the information and communication network by which the ICS is linked to other devices or systems of the industrial object.

Some advantages of the present disclosure over other approaches are capabilities for:

detecting and subsequent classification of software, including malicious software, having a significant impact on a particular configuration of the ICS;

detecting of the weak points of particular configurations of the ICS with subsequent generating of a corresponding reporting; and formation of a testing device simulating a particular configuration of the infrastructure of an ICS or the entire ICS with subsequent testing of samples of the investigated software on the testing device.

FIG. 1 presents an example of the architecture of an industrial infrastructure 100, for which the method of the present disclosure is realized. The industrial infrastructure 100 may have five different network layers of interaction. The first network layer is the field layer, which includes a number of industrial (field) devices being used. Examples of field devices are sensors, valves, transducers, actuating mechanisms, such as a pump, a laser, or a machine tool, as well as other devices. The second network layer is the technological network, which includes various industrial controllers, especially programmable logic controllers (PLC). The controllers provide the control of the field devices and interact with the components of the third network layer. The third network layer is the control layer (a distributed computer network), which includes work stations (computers), servers, and network devices. The work station may contain an industrial control system (ICS), such as an automated control system for a technological process (ACS TP) or SCADA. The servers may perform functions of computing, control and monitoring. The fourth layer is the enterprise layer (office network), which generally includes the personal work stations of the employees of the industrial enterprise and servers. The fifth network layer is the layer of interaction with essential devices external to the enterprise, which can be connected to through an information and communication network such as the Internet.

Examples of industrial automation and control systems (IACS) may include one or more industrial controllers, which facilitate the monitoring and control of the corresponding industrial devices and processes. Industrial controllers, such as PLCs, can exchange data with field devices with the aid of built-in wired inputs/outputs (I/O) and/or through a factory network, bringing together the technological network and the network of the control layer. An industrial controller can usually receive any given combinations of digital or analog signals from the field devices, which can display the current condition of the industrial devices and/or the industrial processes related to them (such as temperature, position, presence or absence of components, liquid level, and so forth), and can execute a control program previously determined by the user, which can carry out automated decision making for the industrial processes being monitored on the basis of the signals received. Such control programs are also known as target software. An industrial controller can put out a corresponding digital and/or analog control signal to the field devices in accordance with decisions made by the control program. The outputs may contain signals for control of a device, signals for control of temperature or position, working commands of a robot for the processing or movement of materials, signals for the control of a mixer, signals for control of motion, and so forth. A control program may contain any suitable type of code which can be used for the processing of the input signals which are read into the controller, and for control of the output signals generated by the industrial controller, including, among others, ladder logic, functional diagrams, block diagrams of functions, structured text or other similar platforms.

Figure 2:
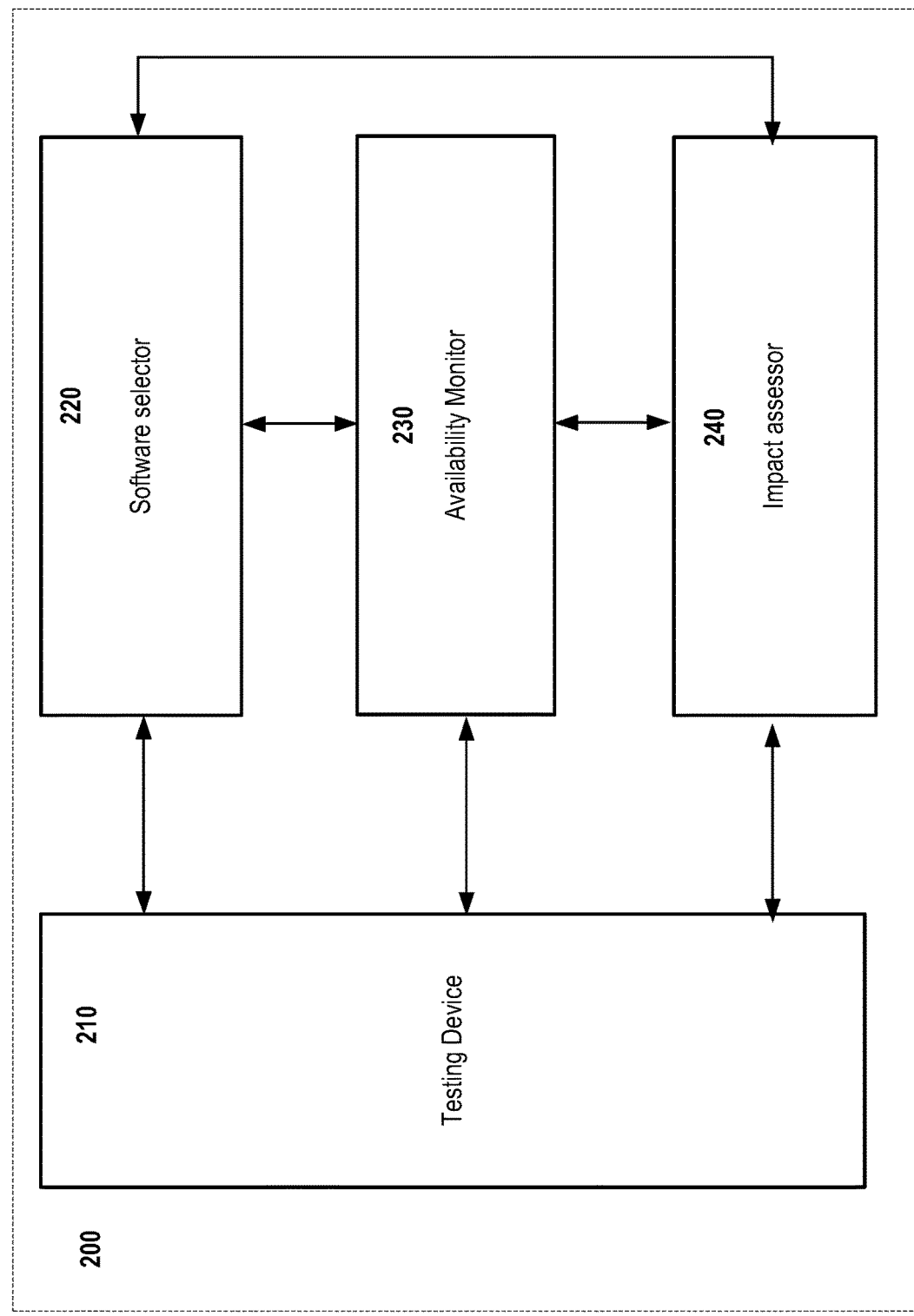
FIG. 2 illustrates a system for assessing the impact of software on operations of a particular configuration of an infrastructure of an IACS (e.g., on an ICS), in accordance with the teachings of the present disclosure.

FIG. 2 illustrates a system 200 for assessing the impact of software on operations of a particular configuration of an infrastructure of an IACS (e.g., on an ICS), in accordance with the teachings of the present disclosure. The infrastructure configuration of the IACS is produced based on a combination of particular components or devices, of which the architecture of the industrial infrastructure 100 is composed, as shown in FIG. 1.

When checking the operations of the ICS, first of all a check is done for a sign of working capability of the ICS, such as the detecting of a denial of service of at least one component of the ICS or the ICS itself. The system 200 for assessing the impact of investigated software on the operations of an ICS (hereinafter, the system of assessment) 200 functionally includes at least a testing device 210, a software selector 220, an availability monitor 230 and an impact assessor 240 (means of assessing the impact of the investigated software). The composition of the system 200 presented in FIG. 2 corresponds to a functional presentation of the system 200 for assessing the impact, where the realization of the various components may vary. The various components of the system 200 for assessing the impact may be realized either jointly in a same device or on separate devices, e.g., either on a same computer or on separate computers. For example, the software selector 220, availability monitor 230, and impact assessor 240 may be integrated within the testing device 210 (i.e., within the same computer). In another example, the software selector 220, availability monitor 230, and impact assessor 240 may be realized on separate computers. An exemplary computer for realizing the system 200 is presented in FIG. 7.

The testing device 210 is configured to carry out a testing of a particular configuration of the ICS, obtained or produced according to a specification using at least one sample of an investigated software obtained from the software selection software selector 220. During the testing, an exchange of data occurs between the components of the ICS. In order to perform the testing, the testing device 210 makes it possible to repeat certain configurations of the ICS according to the simulation by at least one control program. The creation of the testing device 210 simulating a particular configuration of the ICS can be done either using actual components of the ICS or using virtual components of the ICS. The realization will depend on aspects of the testing device 210 itself. When using virtual components, accordingly the testing device 210 will also be virtual and realized on a computing device using corresponding technologies, such as virtualization and simulation.

When the testing device 210 is realized with the aid of hardware (equipment), the selection of components for the simulation of a particular configuration of the ICS is done according to the obtained specification of the ICS and the functional capabilities of the components. Depending on the functional capabilities, a corresponding information exchange of data will occur between the components during the testing. For example, the configuration of the ICS is a technological network bringing together at least one controller PLC and at least one SCADA system. The SCADA systems and PLC controllers are located on different computers (equipment). The computer with the SCADA system (K1 hereafter in the example) will exchange data with each computer of the PLC controllers (K2 hereafter in the example). Thus, K1 at every second requests information from K2 as to the condition and operating mode of the equipment which is controlled by the corresponding PLC controller.

The preliminary preparation of the testing device 210, specifically, the formation of a particular configuration of the ICS for the assessment, is done either with the aid of an operator (e.g., a user) of the testing device 210, or automatically. When the preparation of the testing device 210 is performed in an automated manner, the testing device 210 already constitutes a technological network that brings together a large number of different components of the ICS. The large number of different components of the ICS are brought together in at least one common information and communication network (hereinafter, the network). When producing the specification of the ICS, certain components on the testing device 210 will be switched on or off until such time as the particular configuration of the ICS has been formed according to the specification. It should be noted that the formation of a particular configuration of the ICS on the testing device 210 may generally be based on a duplication of the existing technological network for conducting the testing.

In other words, the testing device 210 enables monitoring, control and analysis such that the impact of samples of investigated and especially malicious software on the operations of a particular configuration of the IACS may be determined. The determination of the impact is performed with the aid of at least one availability monitor 230 and an impact assessor 240, wherein the testing device 210 obtains the specification of a particular configuration of the IACS and at least one sample of one investigated software from the software selector 220.

The software selector 220 is designed to generate a set of samples of investigated software for sending the generated set to the testing device 210 and/or to the availability monitor 230, said set containing at least one sample of one investigated software. The selection of the software samples for the set is based on a controlled investigation of the execution of the investigated software followed by generating an event log and analysis thereof to identify effects representing a potential threat to the configuration of the ICS including at least one of: the availability, the working capability, or the integrity of the components of the ICS. The availability refers to the existence of access to the configuration of the ICS or to its components, i.e., the absence of a denial of service. That is, the availability indicates whether or not a denial of service exists in regards to access to the configuration of the ICS or to its components.

Figure 7:
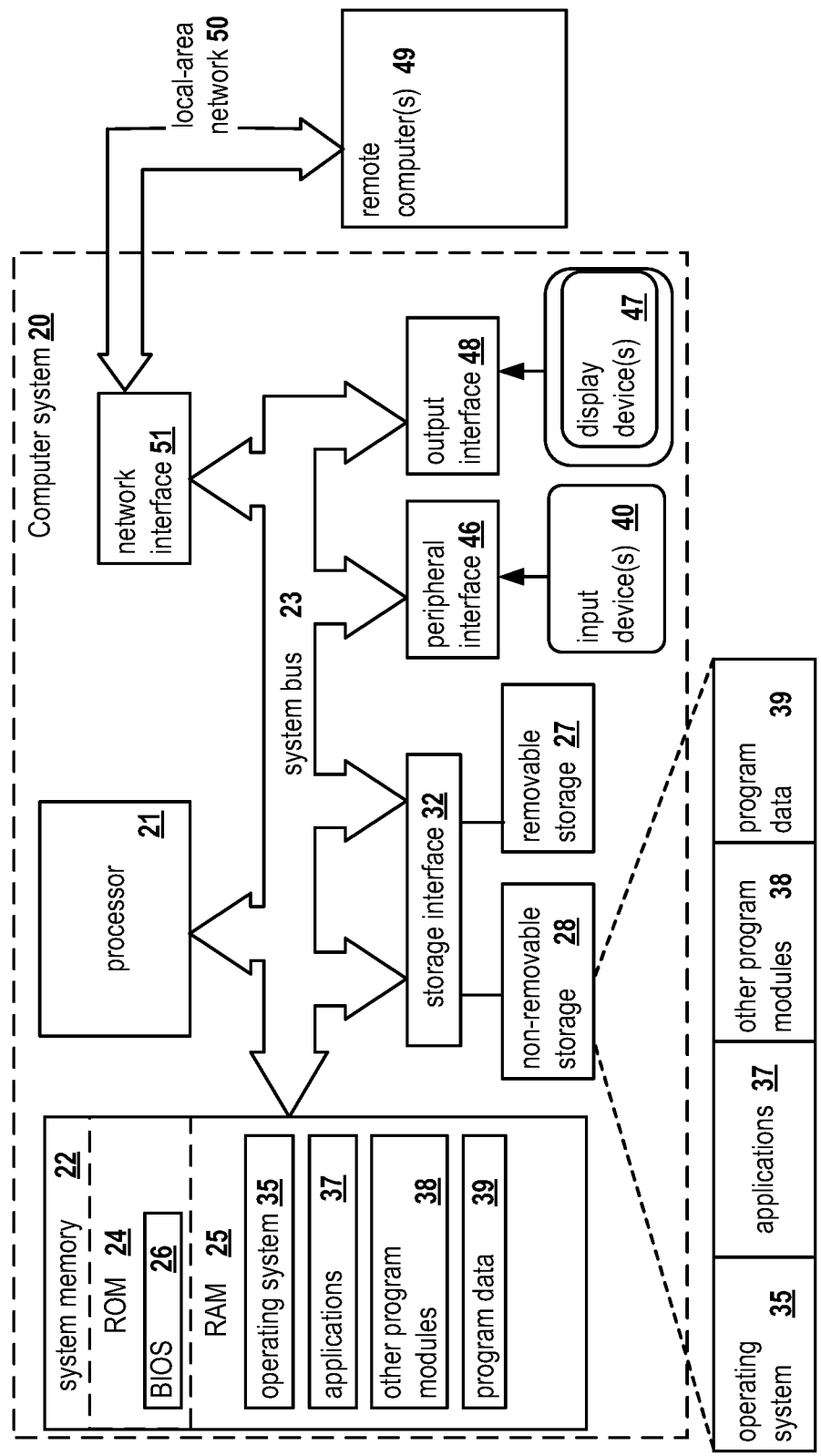
FIG. 7 presents an example of a general purpose computer system on which aspects of the present disclosure can be implemented.

In one aspect, the generating of the set is performed as follows. First, the software selector 220 obtains samples of malicious software from an external network. In one aspect, the external network is the Internet. It should be noted that there are a huge number of malicious software. Therefore, the software selector 220, depending on the aspect of the present disclosure, obtains both the most popular samples of malicious software and those representing the greatest threat. In one aspect, the greatest threat is characterized by a high risk of causing harm. In another aspect, the limiting criterion in the choice of samples of malicious software is the popularity of the malicious software, e.g., obtaining the most popular malicious software for a particular kind of device or equipment, and for a particular configuration of the IACS. The devices use different platforms during their operations, such as x86 and ARM. The obtained samples of the malicious software are investigated with the aid of a sandbox technology. The sandbox technology refers to a technology that is in a specially segregated (isolated) environment on a computer for the purpose of safe execution of computer programs. An example of such an environment is a virtual machine. The sandbox is realized within the software selector 220, which in turn may be realized with the aid of a computer as represented in FIG. 7. Depending on the aspect of the present disclosure, the sandbox may constitute a standard environment, such as one simulating a personal computer, or a specific environment, where the specifics of the environment relate to the presence of a SCADA component and/or the processes running in that environment, the files on the disk, the register keys and the network ports which are specific to the technological networks.

During the analysis, an event log is generated for each malicious software, containing all activities taking place during the execution of the malicious software in the isolated environment. Based on the analysis of the activity log of each malicious software, the software selector 220 makes a selection of suitable malicious software for testing on the testing device 210. Thus, as noted above, the selection of samples is done based on a number of indicators which characterize (indicate) actions representing a threat to the availability or working capability, and to the integrity of the particular configuration of the ICS. Examples of such indicators include at least indicators for:
- a manipulation of memory of other processes occurring, where the manipulation involves read or write operators;
- a large volume of memory being allocated, for example, equal to or greater than 1 Gb;
- a set of operations with files being performed (read/write of files), where the set of operations includes two or more operations, depending on the particular file;
- a manipulation of system settings occurring, such as one in the configuration files and/or registry;
- a manipulation of system files occurring, such as writing to them;
- a set of operations occurring with the registry, where the set of operations involve writing to the registry, and the set of operations includes two or more operations;
- a loading of a driver occurring; and
- a manipulation of processes occurring, wherein the processes are running in a sandbox and are specific to technological networks.

Upon identifying at least one of the selection criteria during the analysis of the event log, the software selector 220 makes a decision that the sample of the malicious software is suitable for subsequent testing on the testing device 210, wherein the testing device 210 simulates the particular configuration of the ICS. In this case, the sample of the malicious software is included in the set of samples of investigated software for sending to the testing device 210. Afterwards, such a selection of investigated software enables a more personalized approach to the testing of particular configurations of the ICS.

The availability monitor 230 is adapted to monitor the automatic testing performed for the particular configuration of the ICS being simulated on the testing device 210. During this testing, the availability monitor 230 identifies the impact of each sample of the investigated software on the access to each component contained in the tested ICS, or the impact on the particular configuration of the ICS, as a whole. Moreover, in one aspect, the availability monitor 230, likewise, possesses a functionality which is able to measure the level/degree of the identified impact. In one aspect, the level of the identified impact may be measured using one or more of probabilistic and definitive measurement techniques. In one aspect, the measurement of the level of the identified impact is based on a previously generated scale.

In one aspect, the availability monitor 230 may comprise a server or router, which performs an information exchange of certain data between the components of the ICS and records the parameters of appropriate metrics for the tested ICS. The exchange of data in this case occurs with the aid of a "mirror port" or mirroring, i.e., there is a duplication of the packets of one port of the network switch onto another one. The metrics are determined according to the configuration of the ICS. A complete listing of the metrics which the availability monitor 230 can measure/record is kept in a database (not shown in FIG. 2).

In another aspect, the testing on the testing device 210 is done by the availability monitor 230. To carry out the testing, the availability monitor 230 obtains from the software selector 220 a set of samples of the investigated software. Next, the availability monitor 230 generates a series of automated tests depending on the number of samples of the investigated software in the obtained set, and the components making up the configuration of the ICS being simulated on the testing device 210. The generated series includes at least one testing. The scenario of each testing describes the interaction between the components of the ICS being tested and the at least one sample used of one investigated software. In one aspect, the testing involves at least one run of the scenario of interaction of the components of the ICS being tested, wherein the at least one run is performed after the infecting/embedding of at least one sample of one investigated software in the technological network of the testing device 210.

For an illustrative example, suppose we consider an example of one testing scenario. Suppose also it is assumed that the ICS includes two components:
- computer A, containing a SCADA system, and
- computer B, containing a PLC controller, which in turn monitors the working of a pump.

Then, according to the scenario, a sample of one malicious software has been embedded in the testing device 210. The pump is designed to fill a tank with water. Computer A performs an exchange of data with computer B by the protocol OPC UA. Thus, every second computer A requests information from computer B as to the condition and operating mode of the pump, where the data on the operating mode contain information: whether the pump is on or off, how much water is the pump pumping, and how much water has been pumped by the pump (filled into the tank). In the event that the tank has been filled, computer A sends to computer B a command to turn off/halt the pump. In the given example, the metrics for the assessment are:
- the speed of sending requests from computer A to computer B, and
- the delay in the reaction of computer A to a situation where computer B reports a full level of the tank.

Thus, the testing includes, gathering data on communication between components that make up the ICS configuration (i.e., monitoring). The gathered data includes at least a time of sending a request from a component to another component of the ICS configuration, a time of responding to a request from another component of the ICS configuration, a time of delay in a reaction of a component to a command to act on a component of the ICS.

In such an investigation scenario, the sample of the malicious software may have a certain effect, e.g., an effect that increases the time of processing of the request for information about the condition, and/or an effect that increases the time for sending the response to the request for information. For example, if originally, the response for the information was being sent once a second, it may now be sent once every three or more seconds—in which case, a situation may arise where it is possible that computer A reacts late to an overfilling of the tank.

In another example, suppose there is a scenario in which a component (such as the pump mentioned above) is assigned a certain enabling range of parameters. Suppose also the time for switching off the pump is up to 1 second, and it has been determined over the course of operations that a disconnection occurs in 0.2 seconds (e.g., on average). Suppose also during the testing of a malicious software, the average time of disconnection of the pump becomes 0.8 seconds. The 0.8 seconds may not be considered critical but may leave little time for unforeseen situations. For example, a drop in the pump's productivity may occur for other legitimate reasons, and there may be no time resource left for the legitimate reason.

In one aspect, during the course of the testing, the availability monitor 230 also generates a report on the effect of the investigated software, which is embedded in the testing device 210 (the ICS being tested). In one aspect, the report on the effect of the investigated software is generated according to parameters of metrics, which are defined primarily for enabling an assessing of the productivity and the temporary failures in operations of the ICS (e.g., denial of service). An example of a typical failure in the operations of the ICS is a situation where the network services or the entire computer do not perform the functions expected of them. In the previous example, if computer A does not poll the computer B, while the pump is running, the tank will overflow, which might result in breakage of the pump, and more serious consequences may occur.

In one aspect, the results of the tests that are performed are sent by the availability monitor 230 to the impact assessor 240. In one aspect, the results are sent in the form of a report.

In one aspect, the results contain information on at least one of: the working capability, the productivity, the effectiveness and the operational qualities of both the ICS as a whole, and of each of its components, data exchange during the interaction of the components, any deviations that occur in the ICS, and the samples of the investigated software that were used for the testing.

In one aspect, the impact assessor 240 is designed to assess the degree of impact (level of impact) of the investigated software on the mentioned ICS based on measurements taken of the parameters of the metrics, by the availability monitor 230, during the performance of the testing of the particular configuration of the ICS simulated on the testing device 210.

During the analysis of the obtained data, the impact assessor 240 assesses the impact of each investigated software on the ICS and determines which consequences may occur in the event of the ICS being infected with the corresponding investigated software. The consequences that are determined by the impact assessor 240 include indications as to a type and an extent of harm that would be caused to the tested configuration of the ICS. In other words, what the harm consists of is determined.

In one aspect, the assessment of the impact may be based on a probabilistic technique. For instance, a number indicative of the probability may be given in a range of 0 (corresponding to lowest probability) to 100 (corresponding to the highest probability). Therefore, when performing the testing, even when the components of the IACS (in particular, components of the ICS) are operating in the permitted range, a nonzero impact assessment may be achieved. This enables indicators of danger to the ICS to be detected, even when each individual component is working in permitted bounds. The aggregate of the components indicates a danger on account of the weighted assessment for all components.

In another aspect, the impact assessor 240 additionally generates recommendations based on the assessment made. In one aspect, the recommendations may contain information of the following kind:
 a recommendation for enabling a detecting of indicators of infection of the systems of the ICS with dangerous software (malicious software), including without an installation of a special software (such as antivirus software);
 a recommendation for protecting against infecting by malicious software;
 a recommendation for removal of infection or embedding of software and its consequences;
 a recommendation for correction of a component of the ICS or a network traffic (the data being sent during the interaction of the components) which are subjected to the influence of the investigated software; and
 a recommendation for performing of additional testing.

In one aspect, during the assessment, a determination of the most dangerous malicious software may also be done. In one aspect, the most dangerous software is the software which causes irreversible deviations in the ICS.

In one aspect, the impact assessor 240 may generate a danger rating based on a series of investigations on a number of configurations of the ICS. In one aspect, the danger rating contains information about the most dangerous malicious software for the technological systems (networks).

Figure 3:
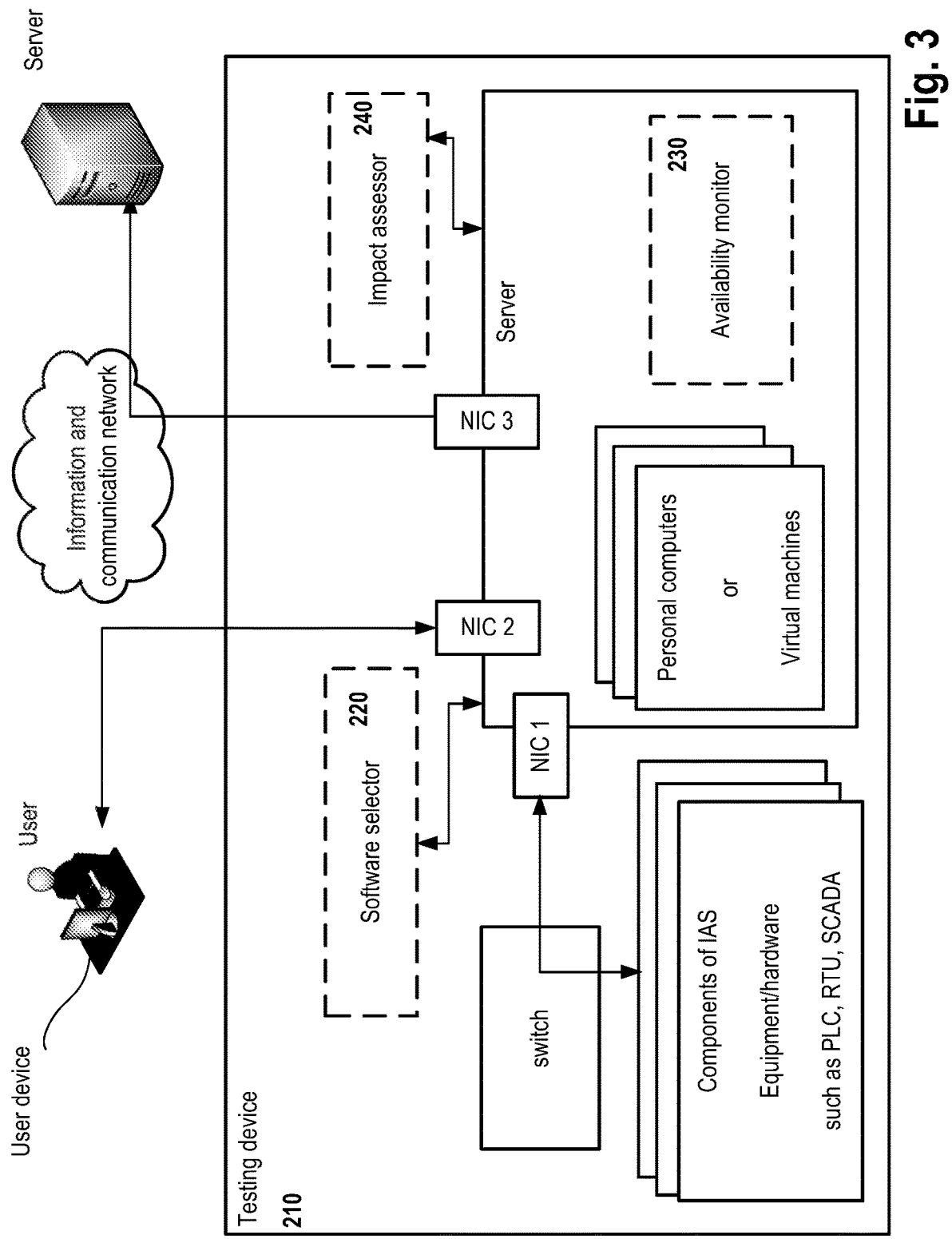
FIG. 3 illustrates an exemplary testing device designed to simulate a particular configuration of an IACS, in particular an ICS, in accordance with the present disclosure.

FIG. 3 illustrates an exemplary testing device 300 designed to simulate a particular configuration of an IACS, in particular an ICS, in accordance with the present disclosure.

In one aspect, the testing device 210 represents the necessary test infrastructure to perform the simulation of a particular configuration of the ICS in order to investigate the ICS for vulnerability in regard to the investigated software.

In order to generate a particular configuration of the ICS, the testing device 210 contains various components of the ICS, from which the necessary components are selected for testing, and at least one server which is used to generate the necessary work stations of the users or the virtual machines. The server used to generate the necessary work stations of the users may be realized as a virtualization server (i.e. ESXi) or on a physical hardware. It should be noted that the work stations of the users and the virtual machines may be interchangeable, depending on the aspects of the testing device 210. The testing device 210 also includes the software selector 220, the availability monitor 230, and the impact assessor 240. All the elements of the testing device 210 are brought together in a technological network, by means of which the interactions occur. The technological network may be divided up into several networks. Thus, for example, FIG. 3 schematically shows three networks by means of network cards (NIC #1, NIC #2 and NIC #3). The network card (or network interface controller/card) is also known as a network adapter.

The testing device 210 makes it possible to perform the following preliminary actions needed for carrying out the tests. The preliminary action may include actions for:
 setting up the various components of the ICS and the hosts on the server;
 installing various components of the ICS on the testing device, connecting of the ICS and creating of the data stream;
 control and technical attendance of the components of the ICS situated in separate virtual local networks (NIC #1 and NIC #2 respectively); and
 remotely connecting to the components of the ICS (via NIC #3) to perform the testing and the investigation as a whole.

Figure 4:
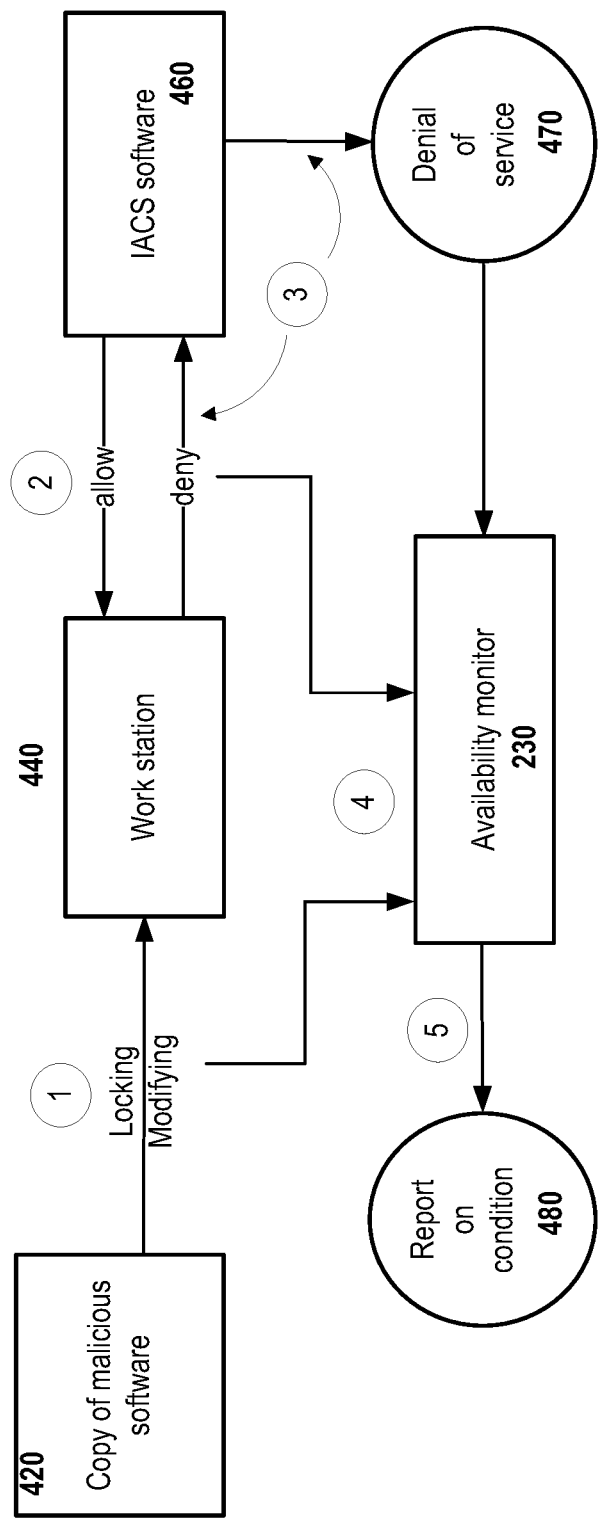
FIG. 4 illustrates an exemplary scenario of an impact of a malicious software on an ICS, during which a denial of service occurs in accordance with the present disclosure.

FIG. 4 illustrates an exemplary scenario 400 of an impact of a malicious software on an IACS, e.g., ICS, during which a denial of service occurs in accordance with the present disclosure. The scenario 400 consists 5 main steps.
 In the first step, a sample of the malicious software 420 is embedded on a work station 440 on which at least one component of the ICS is installed. This sample during its execution produces a locking of the work station 440 or a modification of a local resource of the work station 440. An example of a local resource is the central processor (CPU), the main memory (RAM), files, the register, and so on. Accordingly, a modification refers to a substantial consumption of CPU/RAM or an altering of the memory of processes, files, or the register.
 In the second step, a component of the ICS 460 attempts and fails to obtain access to the local resources of the work station 440 which have been locked or altered by the sample of the malicious software.

In the third step, the component of the ICS 460 becomes unstable (for example, it locks or crashes) or it cannot work properly (i.e., monitor the technological process when working with a field device), resulting in a denial of service 470.

In the fourth step, the availability monitor 230 gathers the events which have occurred in the preceding steps 1-3.

In the fifth step, the availability monitor 230 compiles a report on the discovered anomalies 480.

Other scenarios may involve a modification of several local resources (for example, the configuration of the operating system, the configuration files of applications, and so forth), which influence the incorrect operation of the components of the ICS, and a locking or modification of network resources (such as a DoS of the network equipment and the PLC).

The availability monitor 230 may be developed, for example, with the use of the Windows Performance Analysis (WPA) productivity analysis framework, and also on user drivers of filters. Developing the availability monitor 230 using WPA and on user drivers of filters makes detection of a broad spectrum of events possible.

Figure 5:
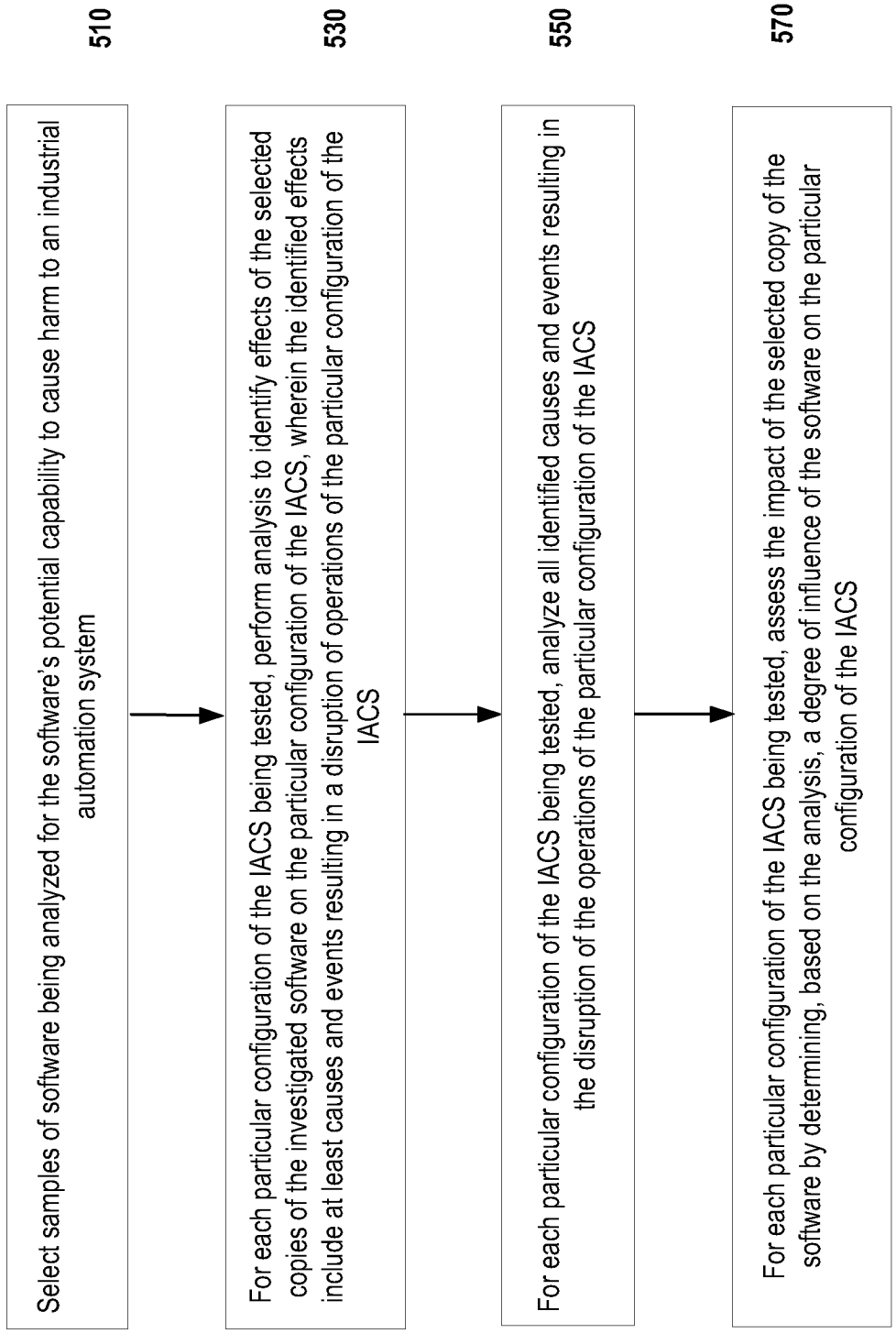
FIG. 5 illustrates a block diagram illustrating an exemplary method of assessing an impact of software on components of an industrial system in accordance with the present disclosure.

FIG. 5 illustrates a block diagram illustrating an exemplary method 500 for assessing an impact of software, e.g., malicious software, on components of an IACS in accordance with the present disclosure. The method 500 may be realized using the system described in FIG. 2.

In step 510, method 500 selects samples of software being analyzed (i.e., investigated software) for the software's potential capability to cause harm to an industrial automation and control system (IACS), and in particular, to an industrial control system (ICS).

In one aspect, the selection of the samples of the software is performed using any number of criteria which indicate effects that represent a threat to at least one of: an availability, an operational capability, and integrity of the configuration of the IACS.

In one aspect, the selection of the samples of the software is performed by: launching and executing each sample of the software in an isolated environment of a sandbox; generating an event log during the executions in the sandbox, wherein the generated event log contains all activities occurring during the execution; and selecting a suitable sample of the software to be investigated for the testing on the testing device based on an analysis of the generated event log. Thus, suitable "investigated software" for the testing on the testing device 210 is selected based on analyzing the generated event log (i.e., the event log generated from the executions in the sandbox).

In step 530, for each particular configuration of the IACS being tested, method 500 performs analysis to identify effects of the selected samples of the investigated software on the particular configuration of the IACS, wherein the identified effects include at least causes and events resulting in a disruption of operations of the particular configuration of the IACS.

In one aspect, the testing includes monitoring requests and responses among components of the particular configuration, gathering data that includes at least one of:
 a time for sending a request from one component to another component of the particular configuration,
 a time for responding to a request from a component of the particular configuration, and
 a time of delay for a reaction of a component to a command to act on the particular configuration of the IACS.

In one aspect, the analysis for identification of the effects of the selected samples is performed in an automated manner.

In one aspect, the analysis for identification of the effects of the selected samples includes carrying out at least one test aimed at gathering data about the influence of the selected software on the configuration of the IACS being tested and being simulated on the testing device 210. The number of tests will depend on the number of investigated software. During each test, the sample of the investigated software is embedded in the configuration of the IACS being tested and a certain information exchange of data is carried out between the components of the configuration of the IACS being tested. The information exchange of data is determined according to the actual components of the configuration and the tasks those components need to carry out. During each test, all identified causes and/or events resulting in disruption of the operations of the testing device 210 simulating the configuration of the IACS are registered. An example of a disruption may be any deviation in the operations of a component of the configuration of the IACS that results in a denial of service of the respective component, or a denial of service of the entire configuration of the IACS, as a whole.

In step 550, for each particular configuration of the IACS being tested, method 500 analyzes all identified causes and events resulting in the disruption of the operations of the particular configuration of the IACS.

In one aspect, the cause includes at least one of: the time for sending the request exceeding a first predetermined threshold, the time for responding to the request exceeding a second predetermined threshold, and the time of delay for the reaction exceeding a third predetermined threshold.

In step 570, for each particular configuration of the IACS being tested, method 500 assesses the impact of the selected sample of the software by determining, based on the analysis, a degree of influence of the software on the particular configuration of the IACS, and a probability of degradation of computing resources of the particular configuration of the IACS.

The selected software for which the impact is being assessed is the "investigated software". Based on the analysis, a degree of influence of the investigated software on the particular configuration of the IACS is determined. In addition, method 500 also determines the probability of degradation of computing resources of the particular configuration of the IACS that is being simulated on the testing device 210.

In one aspect, the method further comprises: for each particular configuration of the IAS being tested, generating a recommendations based on the assessment of the impact of the selected sample of the software, the recommendations including at least one of: a recommendation for enabling a detecting of indicators of infection with the sample of software, a recommendation for protecting against infecting by the selected sample of software, a recommendation for removal of the sample of software and removal of consequences of infection by the sample of the software, a recommendation for correction of a component of the particular configuration subjected to an influence of the sample of the software, and a recommendation for performing additional testing.

Figure 6:
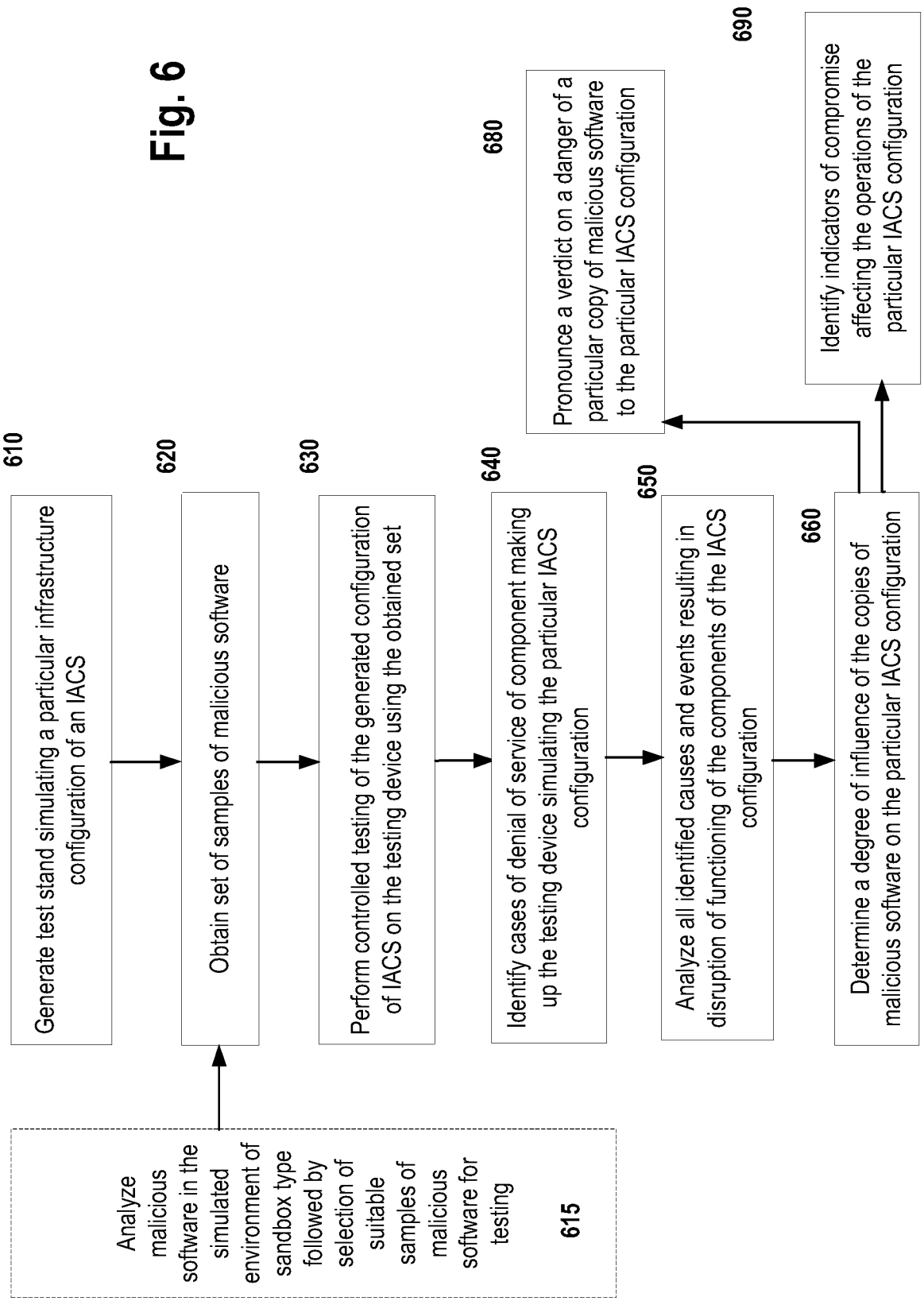
FIG. 6 illustrates a block diagram illustrating a particular instance of a method for assessing an impact of malicious software in accordance with the present disclosure.

FIG. 6 illustrates a block diagram illustrating a particular instance of a method 600 for assessing the impact of malicious software in accordance with the present disclosure. The method 600 is a particular instance of method 500 which is presented in FIG. 5. Namely, method 600 is a method for assessing the impact of malicious software causing a denial of service of the components of a particular configuration of an IACS. The method 600 of the present disclosure may be realized using the system described in FIG. 2.

Suppose, we assume that it is necessary to test a particular configuration of the IACS to assess the impact of a malicious software on the particular configuration of the IACS, i.e., the robustness of the IACS. For the testing to be initiated, first, specifications are sent to the testing device 210, where the specifications contain information about the components of the IACS and their functional capabilities. Moreover, the specification may also contain information on how the interactions occur between the components or how data is exchanged. Such information is relevant in the event that components of the configuration of the IACS have been modified and interactions occur that are not standard for the system being tested for vulnerability.

In step 610, method 600, produces a certain configuration of the IACS on the testing device 210, according to the specifications received for the testing. This process may involve hooking up or disconnecting certain components (devices) for full compliance with the received specifications.

In one aspect, method 600 includes producing a configuration of the IACS on the testing device according to specifications received for testing, wherein the specifications include information on at least one of: the components of the IACS, functional capabilities of the components of the IACS, interactions that occur between the components of the IACS, and information on data exchanged between the components of the IACS.

In step 620, method 600, obtains a set of investigated software, where the set includes at least one sample of one malicious software. Since there is an enormous number of malicious software, the set of investigated software received may be initially limited. For example, the limitations may be based on the popularity of samples of the malicious software or the degree of threat.

In one aspect, method 600 further includes an optional step 615, wherein the samples of software are selected based on at least one of: a type of the industrial system, the components of the industrial system, components of the configuration of the IACS being tested. In other words, the set of investigated software may be previously selected in an optional step 615, and may correspond to a particular kind of device or equipment which includes components of the IACS configuration being tested. In one aspect, in optional step 615, the selection of the set of investigated software is done based on an analysis of the malicious software in a simulated environment of a sandbox (or a sandbox type) with a subsequent generation of an event log, analysis of the event log of each sample of the malicious software, and making a selection of the suitable malicious software for the testing based on the analysis of the event log.

In one aspect, the selection of the malicious software is performed using a series of criteria, indicating effects which represent a threat to at least one of: the availability, operational capability, and integrity of the corresponding particular configuration of the IACS.

In step 630, method 600, using the testing device 210, tests the generated configuration of the IACS using the received set of investigated software. During the testing, an information exchange of data between the components of the IACS configuration occurs. The testing contains a scenario whereby the exchange of data occurs during the testing. Moreover, the scenario also involves the usage of the samples of the malicious software during the testing.

In step 640, during the testing, method 600 identifies occurrences of denials of service of the components of the testing device 210 which are used to simulate the particular configuration of IAC S.

In step 650, method 600, analyzes all identified causes and events related to the identified occurrences of the denials of service, indicating a disruption of the operations of the testing device 210 simulating the particular configuration of the IACS.

In step 660, method 600, determines the impact of the malicious software on the particular configuration of the IACS, and the degree of degradation of the performance of the particular configuration of IACS.

In step 680, method 600, pronounces a verdict as to a danger of the particular malicious software for the particular configuration of IACS based on the determined impact of the corresponding malicious software.

In step 690, method 600, identifies indicators of compromise that influence failure in the operations of the particular configuration of IACS. It is noted that steps 680 and 690 may be interchangeable, and may be performed in parallel.

FIG. 7 is a block diagram illustrating a computer system 20 on which aspects of systems and methods for assessing an impact of malicious software causing a denial of service of components of industrial automation and control systems may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for assessing an impact of malicious software causing a denial of service of components of industrial automation and control systems, the method comprising:
   generating a configuration of an industrial automation and control system (IACS) on a testing device based on specifications;
   obtaining a set of investigated software, where the set includes at least one sample of one malicious software;
   testing the generated configuration of the IACS using the received set of investigated software;
   identifying occurrences of denials of service of the components of the testing device which are used to simulate the generated configuration of IACS;
   determining an impact of the malicious software on the generated configuration of the IACS, and a degree of degradation of a performance of the generated configuration of IACS; and
   pronouncing a verdict as to a danger of the malicious software for the generated configuration of IACS based on the determined impact of the malicious software.

2. The method of claim 1, wherein the specifications include information on at least one of: the components of the IACS, functional capabilities of the components of the IACS, interactions that occur between the components of the IACS, and information on data exchanged between the components of the IACS.

3. The method of claim 1, wherein the at least one sample is selected based on at least one of: a type of the industrial system, the components of the industrial system, components of the configuration of the IACS being tested.

4. The method of claim 3, wherein the at least one sample is selected further based on an analysis of the malicious software in a simulated environment.

5. The method of claim 1, wherein the selection of the at least one sample is performed using any number of criteria which indicate effects that represent a threat to at least one of: an availability, an operational capability, and an integrity of the configuration of the IACS.

6. The method of claim 1, further comprising:
   identifying indicators of compromise that influence failure in the operations of the generated configuration of IACS.

7. The method of claim 6, wherein an assessment of the impact of malicious software is performed for any number of configurations that are generated, such that indicators of compromise are identified for each combination of a particular malicious software and a particular configuration generated of the IACS.

8. A system for assessing an impact of malicious software causing a denial of service of components of industrial automation and control systems, the system comprising:
   at least one processor of a computing device configured to:
      generate a configuration of an industrial automation and control system (IACS) on a testing device based on specifications;
      obtain a set of investigated software, where the set includes at least one sample of one malicious software;
      test the generated configuration of the IACS using the received set of investigated software;
      identify occurrences of denials of service of the components of the testing device which are used to simulate the generated configuration of IACS;
      determine an impact of the malicious software on the generated configuration of the IACS, and a degree of degradation of a performance of the generated configuration of IACS; and
      pronounce a verdict as to a danger of the malicious software for the generated configuration of IACS based on the determined impact of the malicious software.

9. The system of claim 8, wherein the specifications include information on at least one of: the components of the IACS, functional capabilities of the components of the IACS, interactions that occur between the components of the IACS, and information on data exchanged between the components of the IACS.

10. The system of claim 8, wherein the at least one sample is selected based on at least one of: a type of the industrial system, the components of the industrial system, components of the configuration of the IACS being tested.

11. The system of claim 10, wherein the at least one sample is selected further based on an analysis of the malicious software in a simulated environment.

12. The system of claim 8, wherein the selection of the at least one sample is performed using any number of criteria which indicate effects that represent a threat to at least one of: an availability, an operational capability, and an integrity of the configuration of the IACS.

13. The system of claim 8, the process further configured to:
   identify indicators of compromise that influence failure in the operations of the generated configuration of IACS.

14. The system of claim 13, wherein an assessment of the impact of malicious software is performed for any number of configurations that are generated, such that indicators of compromise are identified for each combination of a particular malicious software and a particular configuration generated of the IAC S.

15. A non-transitory computer readable medium storing thereon computer executable instructions for assessing an impact of malicious software causing a denial of service of components of industrial automation and control systems, including instructions for:
    generating a configuration of an industrial automation and control system (IACS) on a testing device based on specifications;
    obtaining a set of investigated software, where the set includes at least one sample of one malicious software;
    testing the generated configuration of the IACS using the received set of investigated software;
    identifying occurrences of denials of service of the components of the testing device which are used to simulate the generated configuration of IACS;
    determining an impact of the malicious software on the generated configuration of the IACS, and a degree of degradation of a performance of the generated configuration of IACS; and
    pronouncing a verdict as to a danger of the malicious software for the generated configuration of IACS based on the determined impact of the malicious software.

16. The non-transitory computer readable medium of claim 15, wherein the specifications include information on at least one of: the components of the IACS, functional capabilities of the components of the IACS, interactions that occur between the components of the IACS, and information on data exchanged between the components of the IACS.

17. The non-transitory computer readable medium of claim 15, wherein the at least one sample is selected based on at least one of: a type of the industrial system, the components of the industrial system, components of the configuration of the IACS being tested.

18. The non-transitory computer readable medium of claim 17, wherein the at least one sample is selected further based on an analysis of the malicious software in a simulated environment.

19. The non-transitory computer readable medium of claim 15, wherein the selection of the at least one sample is performed using any number of criteria which indicate effects that represent a threat to at least one of: an availability, an operational capability, and an integrity of the configuration of the IACS.

20. The non-transitory computer readable medium of claim 15, the instruction further including instructions for:
    identifying indicators of compromise that influence failure in the operations of the generated configuration of IACS.

21. The non-transitory computer readable medium of claim 20, wherein an assessment of the impact of malicious software is performed for any number of configurations that are generated, such that indicators of compromise are identified for each combination of a particular malicious software and a particular configuration generated of the IACS.

* * * * *